United States Patent [19]
Oike

[11] Patent Number: 5,186,203
[45] Date of Patent: Feb. 16, 1993

[54] FREE FLOAT STEAM TRAP
[75] Inventor: Tadashi Oike, Kakogawa, Japan
[73] Assignee: TLV Co., Ltd., Kakogawa, Japan
[21] Appl. No.: 775,403
[22] Filed: Oct. 15, 1991
[30] Foreign Application Priority Data Oct. 15, 1990 [JP] Japan .................. 2-276705
Oct. 15, 1990 [JP] Japan .................. 2-276710

[51] Int. Cl.$^5$ .................................. F16T 1/20
[52] U.S. Cl. ........................ 137/192; 137/399
[58] Field of Search ................... 137/192, 399

[56] References Cited
U.S. PATENT DOCUMENTS

| | | | |
|---|---|---|---|
| 1,566,238 | 12/1925 | Swendeman | 137/192 |
| 2,117,056 | 5/1938 | Dunn | 137/192 |
| 3,489,164 | 1/1970 | Fujiwara . | |
| 3,489,348 | 1/1970 | Fujiwara | 137/192 X |
| 3,785,555 | 1/1974 | Fujiwara . | |
| 4,623,091 | 11/1986 | Stein . | |
| 4,722,744 | 2/1988 | Stoll | 137/192 X |
| 4,867,767 | 9/1989 | Yukoyama . | |

FOREIGN PATENT DOCUMENTS

| | | | |
|---|---|---|---|
| 949345 | 9/1956 | Fed. Rep. of Germany | 137/192 |
| 3534932 | 4/1987 | Fed. Rep. of Germany . | |
| 601723 | 3/1926 | France . | |
| 1543041 | 10/1967 | France . | |
| 2587443 | 3/1987 | France . | |
| 2000274 | 1/1979 | United Kingdom . | |

OTHER PUBLICATIONS

Patent Abstracts of Japan, vol. 14, No. 311 (M-994)(4254) Jul. 4, 1990.
Patent Abstracts of Japan, vol. 14, No. 355 (M-1004) (4298) Jul. 31, 1990.
Steam Traps, "All the traps with none of the pitfalls", Spirax Sarco.

Primary Examiner—Alan Cohan
Attorney, Agent, or Firm—Morgan & Finnegan

[57] ABSTRACT

This invention relates to a free float steam trap which comprises a trap casing having an inlet port and an outlet port and a valve chest formed therein, a valve seat member attached to the lower portion of the valve chest and having a valve orifice opened through which the valve chest communicates with the outlet port, a float valve arranged in a free state in the valve chest, rising and descending in accordance with the water level in the valve chest to directly open and close the valve orifice and a means for dispersing and passing condensate flow downward, provided at a fluid inlet through which the inlet port communicates with valve chest.

4 Claims, 4 Drawing Sheets

FREE FLOAT STEAM TRAP

FIELD OF THE INVENTION

The present invention relates to a free float steam trap adapted to directly open and close a valve orifice by a float valve accommodated in a free state in a valve chest, thereby automatically discharging only condensate from the mixture of steam and the condensate, based on a basic concept that difference in specific gravity between the steam and the condensate is employed.

BACKGROUND OF THE INVENTION

For example, a free float steam trap disclosed in Japanese unexamined patent publication No. 55-135292 is provided with a spherical float itself which rises due to buoyancy and descends in a free state in a valve chest and also has a function of valve body. The steam trap of this type is provided with a single operating portion in comparison with a conventional steam trap in which a float, a level and a valve body are individually separate, and its structure is extremely simple, so that there occurs little trouble. Furthermore, since the entire surface of its float valve put in a free state forms a seal surface, a new valve surface can be easily obtained relative to a valve seat.

The construction of the conventional free float steam trap is shown in FIG. 7. A trap casing is constituted by attaching a cover member 93 to a main body 90 having an inlet port 91 and an outlet port 92. A valve chest 94 is formed in the interior portion thereof. A float valve 95 is accommodated in a free state in the valve chest 94. A valve seat member 96 is mounted on a lower portion of the valve chest 94 and held by a plug 97. At the valve seat member 96 is formed a valve orifice 98 opened to the valve chest 94. The valve orifice 98 communicates with the outlet port 92 through an outlet passage 99. Condensate entering from the inlet port 91 stays in the valve chest 94. The float valve 95 rises and descends due to buoyancy in accordance with the water level thereof so that the valve orifice 98 is opened and closed. The opening of the valve orifice enables the condensate in the valve chest 94 to be discharged and flows to the outlet port 92 through the outlet passage 99.

FIG. 8 is a sectional view substantially taken along a line A—A in FIG. 7, showing a condition that the condensate flows into the valve chest 94 from the inlet port 91. As understood from the FIGURE, the sectional configuration of an inlet for condensate which indicates an inlet portion, and a portion for connecting the inlet port to the valve chest is generally designed to be circular because of the connection to a pipe arrangement. When the condensate flows in this portion, therefore, the condensate flow is gathered at a portion close to a central portion of the inlet port, as shown in the FIGURE, then, becomes a thin water flow and flows down to the valve chest.

In the free float steam trap as mentioned above, the float valve is arranged in a free state in the valve chest, so that there originally arises such a defect that the float valve is liable to be vibrated. Therefore, when the condensate flow falls in a concentrated manner, as mentioned above, the float valve arranged at the destination of a fall of the condensate flow is significantly vibrated due to the action of the condensate flow. As a result, the contact between the float valve and the valve orifice is deteriorated, so that the leakage of fluid, especially, steam in the valve chest occurs.

When the condensate flows into the valve chest 94 from the inlet port 91 in a state as shown by an arrow X in FIG. 7, the condensate so exerts as to press the float valve 95 to the valve orifice 98, so that the float valve 95 is prevented from opening. As a result, there arises a problem that the discharge flow rate of the condensate is decreased.

On the other hand, when the condensate concentrically falls on the valve orifice side, the fluid in the vicinity of the valve orifice is brought into a turbulent state. Therefore, there arises such a problem that steam is liable to be involved in the fluid flowing out to the outlet port through the valve orifice.

Further, when the condensate falling in a concentrated manner is even slightly deflected from the center line of the float valve, namely, the axis of the valve orifice, the condensate flow so actuates as to push the float valve sideward. Consequently, the float valve is turned away from the valve orifice and the leakage of the fluid, especially, steam is induced.

SUMMARY OF THE INVENTION

Accordingly, a technical object of the present invention resides in that float valve is hardly affected by flowing condensate in a free float steam trap.

an object of the present invention is to weaken the impact force of condensate falling on a valve chest which is exerted on a float valve, whereby the vibration of the float valve is suppressed so that a sealing property between the float valve and a valve seat (valve orifice) is improved and the leakage of steam is prevented.

Another object of the present invention is to restrict the turbulent state of fluid present in the vicinity of the valve orifice so that the involving of steam in the outflow fluid can be prevented.

In order to achieve these objects, the subject matter of the present invention resides in a free float steam trap comprising a trap casing having an inlet port and an outlet port and provided with a valve chest formed in an interior portion thereof, a valve seat member attached at the lower portion of the valve chest and having a valve orifice opened through which the valve chest communicates with the outlet port, a float valve arranged in a free state, rising or descending in positions of the valve chest in accordance with water level therein to directly open and close the valve orifice and a means for dispersing and dropping condensate flow which is provided at an inlet for condensate for connecting the inlet port to the valve chest.

According to the present invention, the condensate entering the valve chest from the inlet port is dispersed and falls by means of a dispersing means. The impact force of the condensate imposed on the float valve is, therefore, dispersed, so that the vibration of the float valve is controlled.

BRIEF DESCRIPTION OF THE DRAWINGS

Other features and advantages of the present invention will be apparent from the following description taken in connection with the accompanying drawings, wherein.

DETAILED DESCRIPTION OF THE INVENTION

Figure 1:
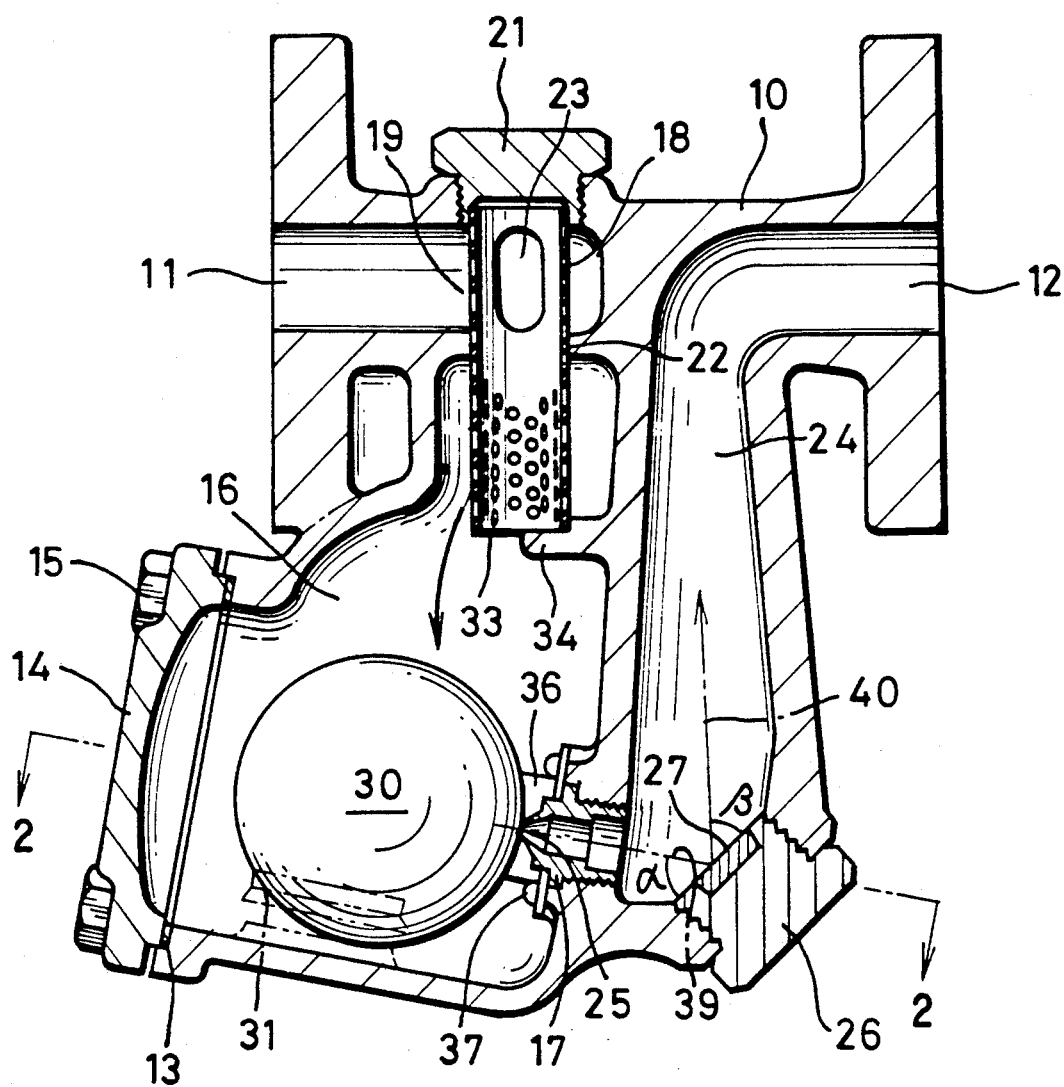
FIG. 1 is an end view of a free float steam trap showing an embodiment of the present invention.

The present invention will now be described in detail with reference to preferred embodiments shown in the drawings.

As illustrated in FIG. 1, a cover 14 is fixed to a main body 10 having an inlet port 11 and an outlet port 12 at upper portions thereof through a gasket 13 by means of bolts 15 so that a trap casing is formed. A valve chest 16 is formed in an interior portion of the trap casing. A fluid inlet 19 through which the inlet port 11 communicates with the valve chest 16 is located in a space above a valve seat member 17 mentioned below. A cylindrical dispersing screen 18 is so arranged in the fluid inlet 19 as to direct its axis toward a vertical direction.

The lower end portion of the dispersing screen 18 is closed by an end member 33. This lower end portion is engaged on a protruding portion 34 in the valve chest. A dispersing screen holder 21 is so threaded on the main body 10 from above as to secure the entire body of the dispersing screen 18. This dispersing screen 18 is divided into an inlet port side and a valve chest side by a partition wall 22. At the inlet port side is opened an opening portion 23.

On a lower side face of the valve chest 16 is attached the valve seat member 17 from the inside of the valve chest 16 by means of a threaded member. In the valve seat member 17, a valve orifice 25 is formed so that the valve chest 16 communicates with the outlet port 12 through an outlet passage 24. The valve orifice 25 is so designed as to make its axis greater as it goes to the outflow direction of condensate. Therefore, the passing resistance of fluid is adapted to decrease.

On the lower portion of the outlet passage 24, a plug 26 is threaded, from the outside of the main body, to a portion with which the condensate flow flowing out of the valve orifice 25 collides. The plug 26, especially a plane portion with which the condensate flow collides is made of a material harder than that of the main body 10 so that it can bear the corrosive action of the condensate flow which flows and collides therewith at high speed out of the valve orifice 25. The plane portion 27 is so arranged that the condensate flow flowing out of the valve orifice 25 advances on a substantially central portion of the outlet passage 24 after it collides with the plane portion 27. In other words, the plane portion 27 is so arranged that angles $\alpha$, $\beta$ respectively formed by the central axis 39 of the valve orifice 25, and the substantially central axis 40 of the outlet passage 24 extending to the thicker portion of wall thickness at an upper portion of the main body 10, relative to the plane portion 27 are equal to each other.

In the valve chest 16 is accommodated a hollow and spherical float 30 made of thin stainless steel plate in a free state. The float 30 floats on the condensate staying in the valve chest 16, rises and descends due to buoyancy in accordance with a liquid level.

On the bottom face of the valve chest 16, two float seats 31, 32 are so formed as to be substantially parallel with the central axis of the valve orifice 25. They serve to support and guide the float valve 30 to the valve orifice 25 when closing the valve orifice. Consequently, when the float valve 30 descends as the condensate in the valve chest 16 decreases to close the valve orifice 25, the float valve 30 abuts on the three points 31', 32', 17' of the float seats 31, 32 and the tip end of the valve seat member 17 (see FIG. 2), so that a complete sealed state is realized.

The condensate flowing out of the inlet port 11 enters the inside space of the dispersing screen 18 from the opening portion 23 of the dispersing screen 18 and descends. The condensate passing through many pores of the valve chest side, is dispersed and falls in the valve chest 16, while foreign materials such as dirt are removed therein. In the case where the dispersing screen 18 is cleaned, the cleaning can be readily done through removing the dispersing screen holder 31.

Figure 2:
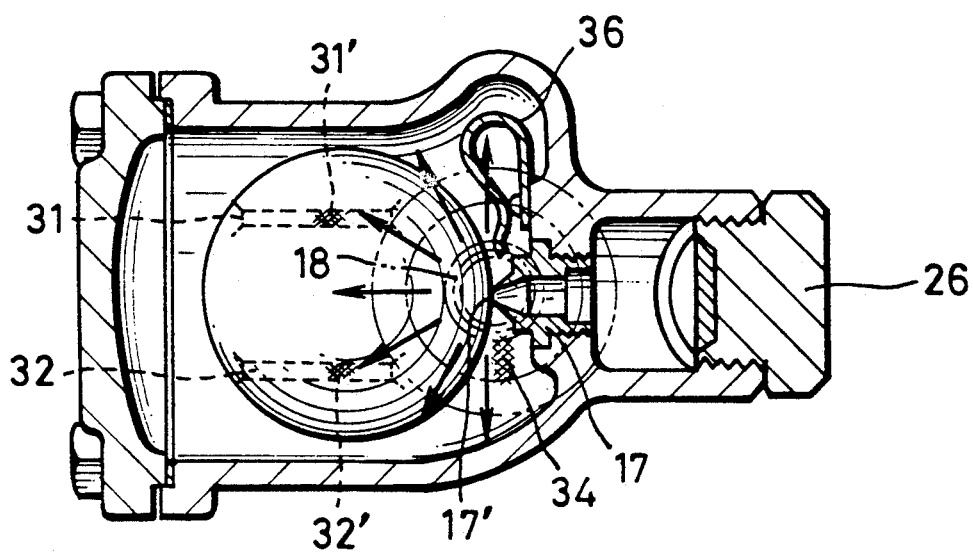
FIG. 2 is a composite view of an end view taken along a line B—B in FIG. 1 and a sectional view substantially taken along a line C—C in FIG. 1.

Reference numeral 36 designates a bimetal strip and is formed in a substantial U-shape in section. This bimetal strip is affixed to the main body 10 through machine screws 37. At the low temperature, the bimetal strip 36 causes the float valve 30 to be separated from the valve seat member 17 to open the valve orifice 25. At the high temperature, the bimetal strip 36 is caused to be retracted to a state as shown in FIG. 2, so that it is disengaged from the float valve 30.

The above-mentioned free float steam trap according to the present invention operates as follows.

The condensate entering from the inlet port 11 connected to a portion in which the condensate is produced, such as a steam employing equipment flows into the dispersing screen 18 from the opening portion 23 and falls in the dispersing screen 18. Since the end member 33 is attached to the lower end portion of the dispersing screen 18, the condensate does not flow into the space of the valve chest 16 which is just under the dispersing screen 18. The condensate is rectified and dispersed through the function of the mesh of the dispersing screen 18 and flows into the valve chest 16 from the lower side face of the dispersing screen 18 as indicated by arrows in FIG. 2.

As a result, the impact force of the condensate imposed on the float valve 30 is weakened, so that the vibration of the float valve 30 is restricted.

Further, since the condensate does not flow to a portion close to the valve orifice in a concentrated manner, the occurrence of the turbulent flow of the fluid in the vicinity of the valve orifice is restricted. Therefore, steam is hard to be involved in the outflow fluid.

Furthermore, since the dispersed and falling condensate strikes the surface of the valve float 30 which is closer to the valve orifice 25 than a perpendicular passing through the center of the float valve 30, as shown by an arrow in FIG. 1, it does not press the float valve 30 to the valve orifice 25. Accordingly, the interference of the valve opening operation of the float valve 30 can be avoided, as a result of which, the condensate can be smoothly discharged.

Generally, in the free float stream trap, the opening degree of the valve orifice 25 is adjusted depending on the rise and descent of the float valve 30, in accordance with the water level of the condensate staying in the valve chest 16, namely, the inflow rate of condensate, so that a continuous discharging operation of condensate is effected. In the free float steam trap according to the present invention, when the water level descends in accordance with the discharge of condensate and the float valve 30 descends and the valve orifice 25 is closed to stop the outflow of the condensate, the valve orifice 25 can be completely closed, because the two lines of float seats 31, 32 are formed in parallel with the central axis 39 of the valve orifice 25.

When the float valve 30 rises due to buoyancy to open the valve orifice 25, the condensate flow flowing at high speed out of the valve orifice 25 with the plane portion 27 of the plug 26. Then, the direction of the flow is so changed as to extend along the substantially central axis 40 of the outlet passage 24. The flow moves upward in the passage 24 and toward the outlet port 12. The high speed condensate flow, after passing through such an outflow path, collides with the thicker portion of a wall thickness in the outlet passage 24, so that the influence of the corrosive action of condensate affected on the life of the steam trap can be suppressed.

Figure 3:
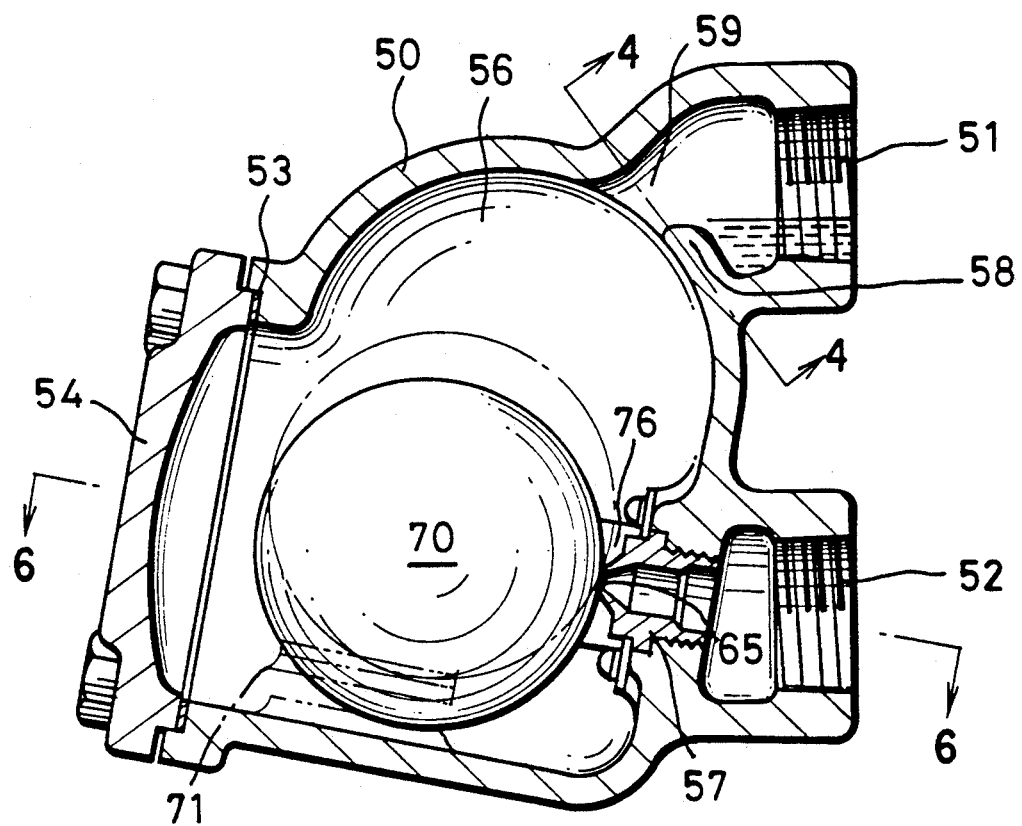
FIG. 3 is an end view of a free float steam trap showing another embodiment of the present invention.

A steam trap shown in FIG. 3 represents another embodiment of the present invention. A cover 54 is fixed to a main body 50 having an inlet port 51 at an upper portion and an outlet port 52 at a lower portion through a gasket 53 by means of bolts to form a trap casing. A valve chest 56 is formed in an interior portion thereof. The inlet port 51 and the outlet port 52 are horizontally opened and respectively provided with internally threaded portions for pipe arrangements. A fluid inlet 59 through which the inlet port 51 communicates with the valve chest 56 is located in a space above a valve seat member 57 mentioned below. In the fluid inlet 59 is formed an overall width dam 58 which is slightly inclined toward the valve chest side. The height of the dam 58 is approximately half of the diameter of the inlet port 51 or the fluid inlet 59. The inclination of the dam is preferably about 5° to 15° with respect to a vertical line, however, it may not be limited thereto.

Figure 6:
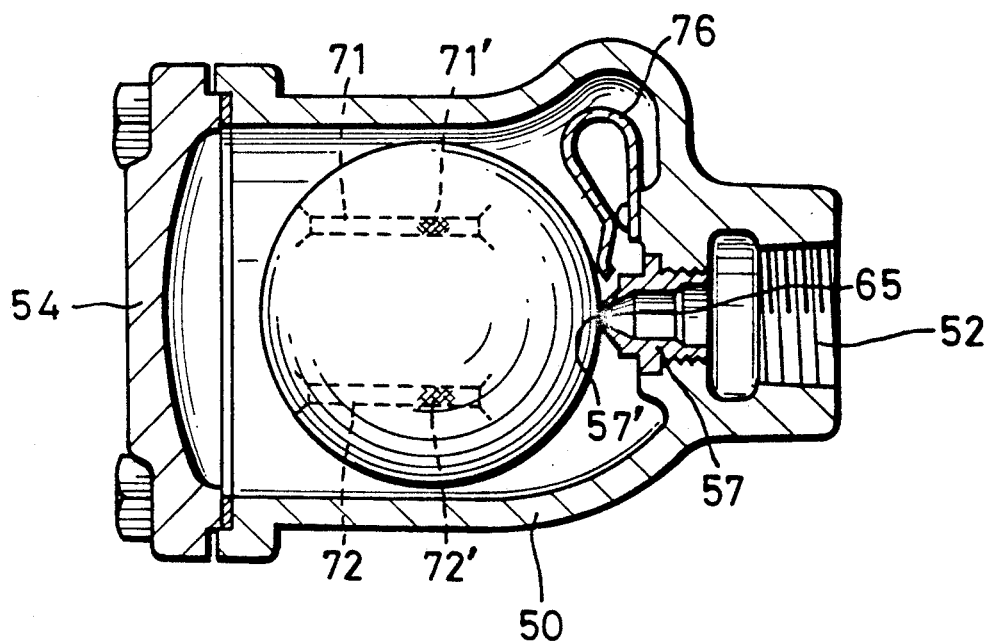
FIG. 6 is an end view taken along a line E—E in FIG. 3.
Figure 7:
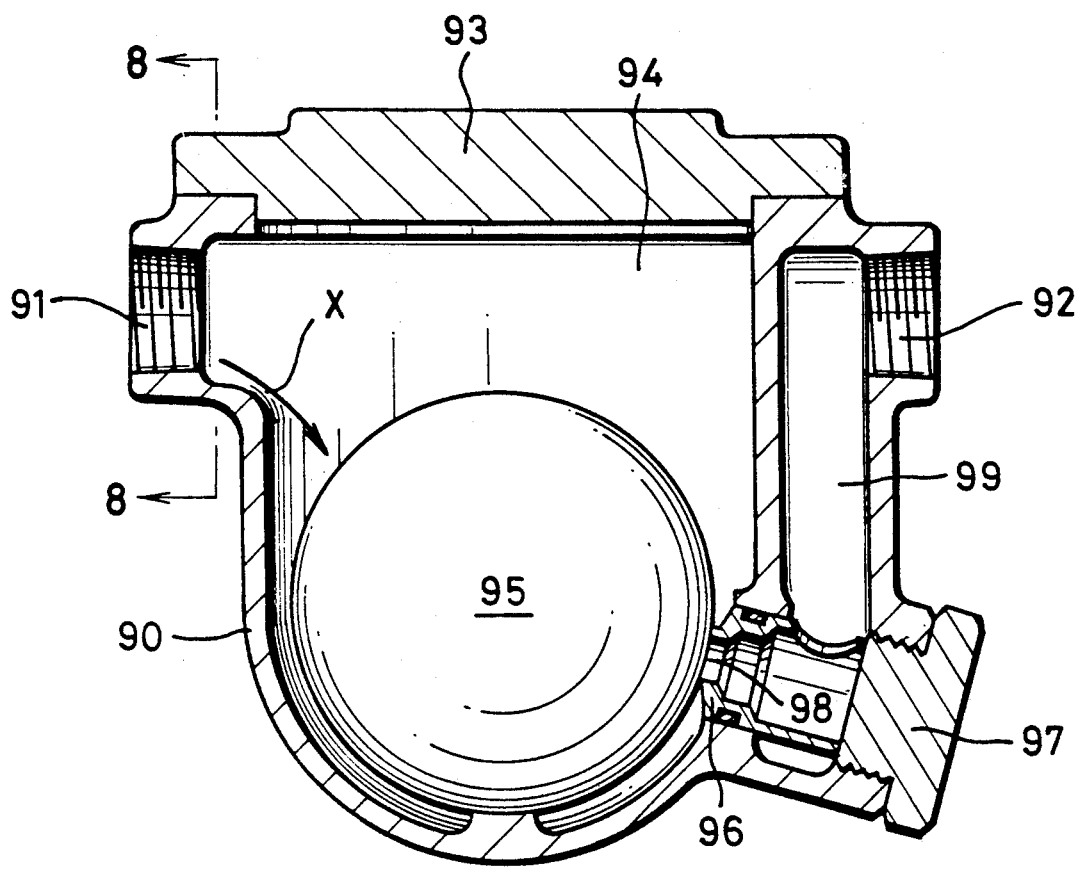
FIG. 7 is an end view of a well-known free float steam trap.
Figure 8:
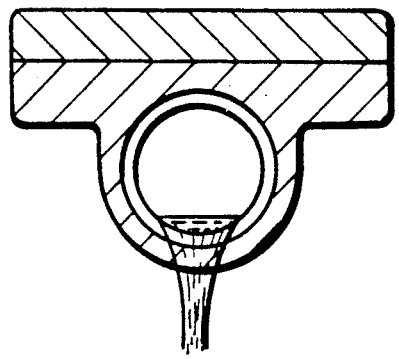
FIG. 8 is a sectional view taken along a line A—A in FIG. 7.

Similarly to the embodiment shown in FIG. 1, the valve seat member 57 having a valve orifice 65 is affixed to the lower side face of the valve chest 56 by means of threaded members. A hollow and spherical float 70 is accommodated in a free state in the valve chest 56. On the bottom face of the valve chest 56, two float seats 71, 72 are so formed as to be substantially parallel with the central axis of the valve orifice 65. As a result, when the float valve 70 descends as condensate and the valve chest 56 decreases to close the valve orifice 65, the float valve 70 abuts on the three points 71', 72', 57' (See FIG. 6) of the float seats 71, 72 and the tip end of the valve seat member 57, so that a completely sealed state is achieved.

Figure 5:
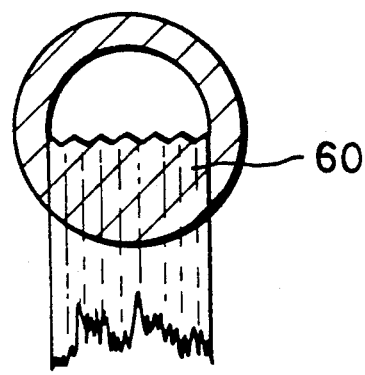
FIG. 5 is a sectional view showing another form of a dam in FIG. 4.

The condensate flowing out of the inlet port 51 is stopped by the overall width dam 58 until it reaches the height thereof. When the amount of the condensate reaches such an amount as to exceed the height of the dam, the condensate crosses the dam 58, is dispersed and flows into the valve chest 56. In order to improve the dispersing effect for the condensate, many slits may be provided at the upper edge portion of a dam 60, as shown in FIG. 5.

Reference numeral 76 designates a bimetal strip similarly to FIG. 1.

The above-mentioned free float steam trap according to the present invention operates as follows.

Figure 4:
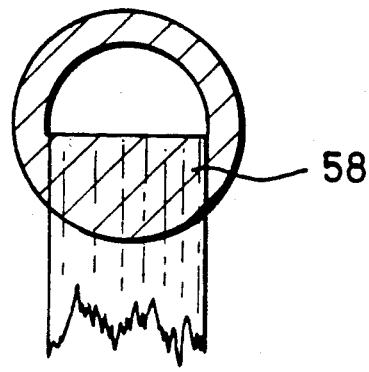
FIG. 4 is a sectional view substantially taken along a line D—D in FIG. 3.

The condensate entering from the inlet port 51 is stored to the height of the overwall width dam 58. The condensate further entering, therefrom crosses the dam 58, is dispersed and flows into the valve chest 56, as shown in FIG. 4.

As a result, the impact force of the condensate imposed on the float valve 70 is weakened, so that the vibration of the float valve 70 is restricted.

Since the condensate does not flow down to a portion close to the valve orifice in a concentrated manner, the turbulent flow of the fluid in the vicinity of the valve orifice is restricted. Therefore, steam is hard to be involved in the outflow fluid.

Further, since the dispersed and flowing condensate strikes the surface of the float valve 70 which is closer to the valve orifice 65 side than a perpendicular passing through the center of the float valve 70 in the drawings, the condensate does not press the float valve to the valve orifice 65. Therefore, the interference of the valve opening operation of the float valve 70 can be avoided, and accordingly, the condensate can be smoothly discharged.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A free float stream trap comprising:
    a trap casing having an inlet port and an outlet port and a valve chest formed therein;
    a valve seat member attached to the lower portion of the valve chest and having a valve orifice opening through which the valve chest communicates with the outlet port;
    a float valve arranged in a free state in the valve chest, rising and descending in accordance with the water level in the valve chest to directly open and close the valve orifice; and
    a means for dispersing and passing condensate flow downward having an upwardly directed end wall spaced from an upper inner surface of the trap casing to form a reservoir, wherein the dispersing means is an overall width dam located substantially above the valve orifice provided in a fluid inlet through which the inlet port communicates with the valve chest.

2. A steam trap according to claim 1 wherein two float seats are so formed on the bottom face of said valve chest as to be parallel with the central axis of said valve orifice.

3. A steam trap according to claim 1 wherein the overall width dam has many irregularities on the upper end portion thereof.

4. A steam trap according to claim 3 wherein two float seats are so formed on the bottom face of said valve chest as to be parallel with the central axis of said valve orifice.

* * * * *